US011570165B2

(12) United States Patent
Xuan et al.

(10) Patent No.: US 11,570,165 B2
(45) Date of Patent: Jan. 31, 2023

(54) SINGLE SIGN-ON SERVICE AUTHENTICATION THROUGH A VOICE ASSISTANT

(71) Applicant: VMWARE, INC., Palo Alto, CA (US)

(72) Inventors: Chaoting Xuan, Sandy Springs, GA (US); Rohit Pradeep Shetty, Bangalore (IN); Erich Stuntebeck, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 301 days.

(21) Appl. No.: 16/785,682

(22) Filed: Feb. 10, 2020

(65) Prior Publication Data

US 2021/0176229 A1   Jun. 10, 2021

(30) Foreign Application Priority Data

Dec. 9, 2019  (IN) .............................. 201941050772

(51) Int. Cl.
*H04L 9/40*  (2022.01)
*G10L 17/00*  (2013.01)

(52) U.S. Cl.
CPC .......... *H04L 63/0815* (2013.01); *G10L 17/00* (2013.01); *H04L 63/0853* (2013.01)

(58) Field of Classification Search
CPC ............. H04L 63/0815; H04L 63/0853; G10L 17/00
See application file for complete search history.

(56) References Cited

U.S. PATENT DOCUMENTS

| 9,286,899 B1 | 3/2016 | Narayanan |
| 9,928,839 B1 | 3/2018 | Lester et al. |
| 10,063,542 B1 | 8/2018 | Kao |
| 10,404,678 B2 * | 9/2019 | Grajek ................ H04L 63/0815 |
| 10,524,092 B2 | 12/2019 | Gandhi et al. |
| 10,719,591 B1 * | 7/2020 | Krieger .................. G10L 17/24 |
| 10,748,546 B2 | 8/2020 | Kim et al. |
| 10,770,092 B1 | 9/2020 | Adams et al. |

(Continued)

FOREIGN PATENT DOCUMENTS

| WO | 2016141972 A1 | 9/2016 |
| WO | 2017131267 A1 | 8/2017 |

OTHER PUBLICATIONS

More.Com, "What will happen if I delete a device from my iCloud account?" https://forums.imore.com/icloud/345348-what-will-happen-if-i-delete-device-my-icloud-account-html, Oct. 18, 2015 (Year: 2015).

(Continued)

*Primary Examiner* — Chau Le
(74) *Attorney, Agent, or Firm* — Thomas Horstemeyer, LLP (VMW)

(57) ABSTRACT

Disclosed are various approaches for authenticating a user through a voice assistant device and creating an association between the device and a user account. The request is associated with a network or federated service. The user is prompted to use a client device, such as a smartphone, to facilitate an authentication flow. A soundwave is played through the client device that contains a secret key, which is then sent to a service that validates the secret key. An association between the user account and the voice assistant device can then be created so that access to third party services can occur.

20 Claims, 5 Drawing Sheets

(56) References Cited

U.S. PATENT DOCUMENTS

| | | |
|---|---|---|
| 10,832,310 B2 | 11/2020 | Isaacson et al. |
| 10,877,718 B2 | 12/2020 | Gosu et al. |
| 11,070,949 B2 | 7/2021 | Gross et al. |
| 2002/0076004 A1 | 6/2002 | Brockenbrough et al. |
| 2004/0199538 A1 | 10/2004 | Matsuda et al. |
| 2008/0021997 A1* | 1/2008 | Hinton ............... H04L 63/0815 709/225 |
| 2008/0144944 A1 | 6/2008 | Breed |
| 2009/0034702 A1 | 2/2009 | Cai |
| 2010/0031329 A1* | 2/2010 | Kim .................... H04W 12/069 |
| 2011/0307790 A1 | 12/2011 | Pandya et al. |
| 2013/0156194 A1 | 6/2013 | Tanioka |
| 2013/0179692 A1 | 7/2013 | Tolba et al. |
| 2014/0281547 A1* | 9/2014 | Modzelewski ......... H04L 63/18 713/171 |
| 2015/0082427 A1 | 3/2015 | Ivanchykhin et al. |
| 2015/0195406 A1 | 7/2015 | Dwyer et al. |
| 2015/0244472 A1 | 8/2015 | Poppe et al. |
| 2016/0119323 A1 | 4/2016 | Krishna |
| 2016/0224548 A1 | 8/2016 | Massand |
| 2016/0373490 A1 | 12/2016 | Sedar et al. |
| 2017/0006044 A1 | 1/2017 | Ezra et al. |
| 2017/0126640 A1 | 5/2017 | Vincent et al. |
| 2017/0223613 A1 | 8/2017 | Wang et al. |
| 2017/0329573 A1 | 11/2017 | Mixter |
| 2017/0345105 A1 | 11/2017 | Isaacson et al. |
| 2017/0346949 A1 | 11/2017 | Sanghavi et al. |
| 2018/0007060 A1* | 1/2018 | Leblang ................. H04L 21/35 |
| 2018/0122378 A1 | 5/2018 | Mixter et al. |
| 2018/0137267 A1* | 5/2018 | Krieger ................. G10L 17/00 |
| 2018/0176270 A1 | 6/2018 | Griffin et al. |
| 2018/0199156 A1 | 7/2018 | Gandhi et al. |
| 2018/0204187 A1 | 7/2018 | Stewart et al. |
| 2019/0007381 A1 | 1/2019 | Isaacson et al. |
| 2019/0116264 A1 | 4/2019 | Sanghavi et al. |
| 2019/0132321 A1 | 5/2019 | Pitchaimani |
| 2019/0163896 A1* | 5/2019 | Balaraman ............... G06F 21/41 |
| 2019/0306137 A1 | 10/2019 | Isaacson et al. |
| 2019/0318002 A1 | 10/2019 | Sharma et al. |
| 2019/0339927 A1 | 11/2019 | Gosu et al. |
| 2019/0361671 A1 | 11/2019 | Maltsev et al. |
| 2019/0377898 A1 | 12/2019 | Dunjic et al. |
| 2020/0084205 A1 | 3/2020 | Bulpin |
| 2020/0120088 A1 | 4/2020 | Jain et al. |
| 2020/0134211 A1 | 4/2020 | Miller et al. |
| 2020/0137053 A1* | 4/2020 | Bhaya ..................... H04L 67/53 |
| 2020/0228521 A1 | 7/2020 | Edwards et al. |
| 2020/0349935 A1 | 11/2020 | Smith et al. |
| 2020/0389314 A1* | 12/2020 | Kunnath ................ H04L 63/18 |
| 2021/0058517 A1 | 2/2021 | Serbajlo et al. |
| 2021/0072951 A1 | 3/2021 | Gosu et al. |
| 2021/0119794 A1 | 4/2021 | Shpurov et al. |
| 2021/0176229 A1 | 6/2021 | Xuan et al. |
| 2021/0306329 A1* | 9/2021 | Conley ............... H04L 63/0876 |
| 2021/0409955 A1* | 12/2021 | Stuntebeck ........... H04W 12/72 |
| 2022/0237273 A1* | 7/2022 | Krieger ............ H04N 21/44218 |

OTHER PUBLICATIONS

Klein, "How to Remove Devices from Your iCloud Account" https://www.howtogeek.com/240710/how-to-remove-devices-from-your-icloud-account/, Jul. 11, 2017 (Year: 2017).

* cited by examiner

SINGLE SIGN-ON SERVICE AUTHENTICATION THROUGH A VOICE ASSISTANT

RELATED APPLICATION

This application claims the benefit of Foreign Application Ser. No. 201941050772 filed in India entitled "SINGLE SIGN-ON SERVICE AUTHENTICATION THROUGH A VOICE ASSISTANT", on Dec. 9, 2019, by VMWARE, Inc., which is herein incorporated in its entirety by reference for all purposes.

CROSS-REFERENCE TO RELATED APPLICATIONS

This application is related to U.S. patent application Ser. No. 16/453,357, filed Jul. 10, 2019 and entitled PROXIMITY BASED AUTHENTICATION OF A USER THROUGH A VOICE ASSISTANT DEVICEA. This application is related to U.S. patent application Ser. No. 16/430,846, filed Jun. 13, 2019 and entitled SERVICE AUTHENTICATION THROUGH A VOICE ASSISTANT. All of the above-referenced applications are incorporated herein by reference in their entireties.

BACKGROUND

In an enterprise setting, individuals can utilize a number of different services and applications that are provided by an enterprise. Some of these services are hosted in a third party environment and some can be hosted on servers operated by the enterprise. These individuals can use authentication credentials to login to these application or services. For example, a user might have an email account or an account with a third party customer relationship management service. Accessing data within these services can be accomplished through a device with which the user is authenticated and which may have an authentication token associated with the user's identity. However, a voice assistant device may not have the capability to easily authenticate the user with his or her service endpoints. In addition, the assistant might be in a shared environment, such as in an office environment, or other environments in which multiple people might have access to the device. Providing access to the user's services to the assistant can create various issues.

First, authentication of the user can be a process can be performed using application programming interfaces (APIs) created by the provider of the assistant ecosystem to link a user's identity with a particular assistant device. However, in a shared environment, the user might not wish to permanently link his or her identity with the assistant device. Additionally, in a shared environment, the user might not have the proper privileges authentication credentials to access and modify the linked accounts on the assistant device. Additionally, a user might simply be hesitant to perform a cumbersome process of linking his or her service accounts to an assistant device and then later unlinking the accounts from the device when use of the assistant device is completed. Additionally, an enterprise might wish to control the authentication process with the assistant device rather than rely upon a provider of the assistant ecosystem to do so.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for obtaining data from services on behalf of a user and on behalf of a voice assistant device. A user might have accounts in various services for which access is authenticated using an identity provider service utilized by the user's enterprise. The user can have an account with the enterprise that deploys an identity provider service to enable single sign-on (SSO) capability for users of the enterprise. The identity provider can verify the user's identity within the enterprise and provide an authentication token that can be used to authenticate the user's access to other services, which may or may not be hosted by the enterprise. For example, a third party conferencing service with which the enterprise provides accounts for its users can authenticate users through an identity provider service.

In an environment in which voice assistant devices are becoming more ubiquitous, providing users access to services provided by the enterprise can be beneficial. However, authenticating users to a SSO portal and/or service endpoints can be challenging. A voice assistant device may not have the capability to easily authenticate the user with his or her service endpoints. In addition, the assistant device might be in a shared environment, such as in a hotel room, an office environment, or other environments in which multiple people might have access to the device. Therefore, examples of this disclosure can enable a persistent authentication of users with a SSO portal through a voice assistant device and also provide the user the ability to easily suspend or sign out from the persistent authentication.

Figure 1:
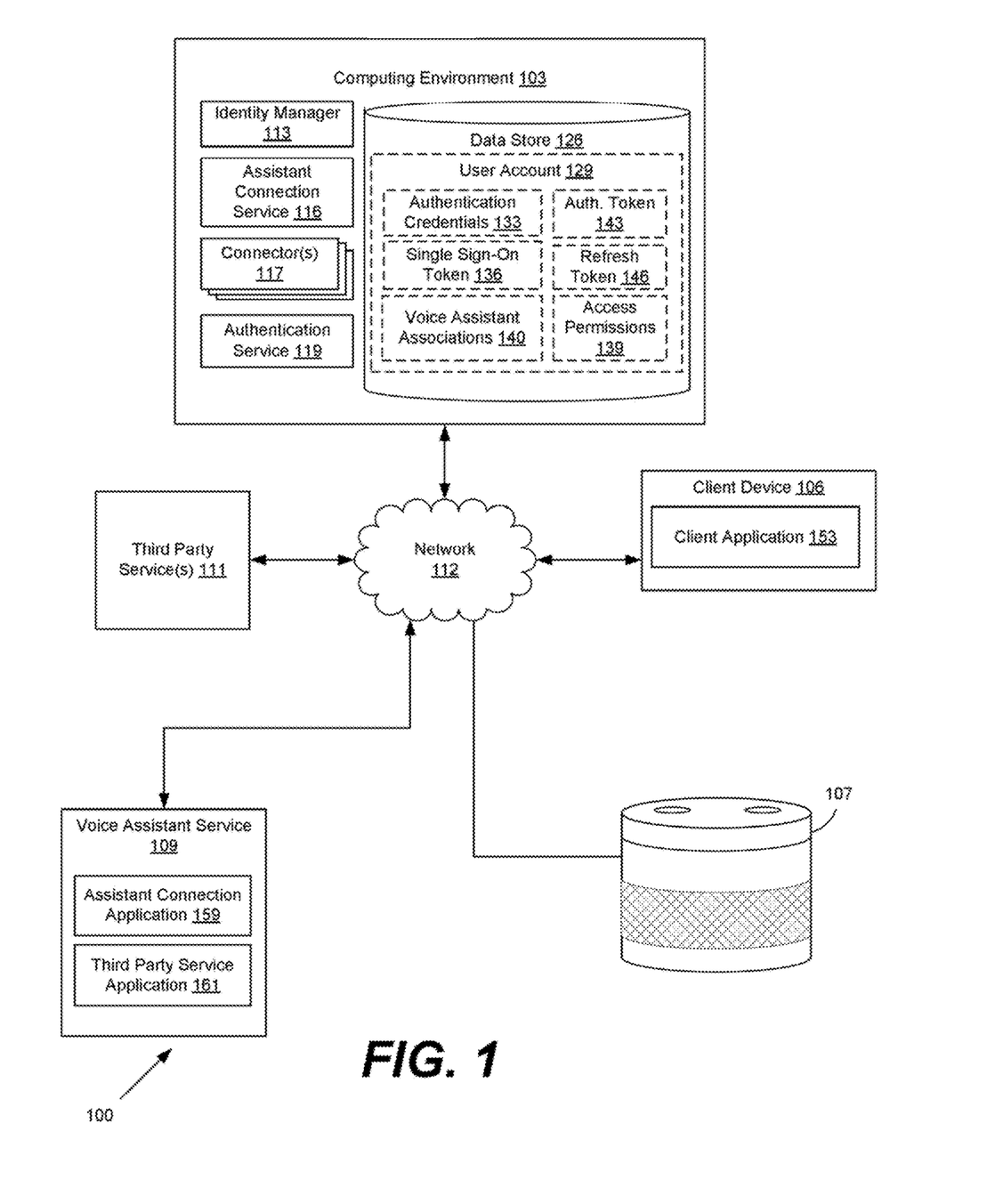
FIG. 1 is a schematic block diagram depicting an example of a network environment according to examples of the disclosure.

Beginning with FIG. 1, shown is an example of a networked environment 100. The networked environment 100 includes a computing environment 103, a client device 106, a voice assistant device 107, a voice assistant service 109, and one or more third party services 111, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, an assistant connection service 116, one or more connectors 117, and an authentication service 119. In some examples, one or more third party services 111 can also be executed in the computing environment 103 in the case of service endpoints that are provided by the enterprise on the same computing resources of the enterprise. In some embodiments, however, one or more of the third party services 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the third party services 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more third party services 111. Examples of identity managers 113 include VMWARE's Identity Manager, Workspace ONE®, or MICROSOFT's Active Directory Federation Services.

The authentication service 119 can retrieve and cache authentication data, such as authentication tokens 143 and refresh tokens 146, provided by various third party services 111. The cached authentication data can be used by the assistant connection service 116 to query the third party services 111 for information.

The assistant connection service 116 can facilitate authentication of users who are using a voice assistant device 107 with the identity manager 113. Additionally, the assistant connection service 116 can enable users to retrieve information from one or more third party services 111 for playback by a voice assistant device 107 that the user can associate with their user account 129 through the assistant connection service 116.

A connector 117 can provide a standardized mechanism for the assistant connection service 116 to communicate with a third party service 111. Each third party service 111 may provide an application programming interface (API) for communicating, querying, or otherwise interacting with the third party service 111, which can include different methods or functions with different parameters compared to other third party services 111. This can allow for the assistant connection service 116 to send a single, uniformly formatted query to one or more connectors 117. Each connector 117 is then responsible for using the information provided in the query from the assistant connection service 116 to invoke the appropriate functions provided by the API of the third party service 111. To add support for a new third party service 111, a new connector 117 can be created without needing to modify the assistant connection service 116 itself. Likewise, if a change is made to the API of the third party service 111, the connector 117 between the assistant connection service 116 and the federated service can be updated without having to modify the assistant connection service 116 itself.

A third party service 111 can be web application, web service, or other network facing application that can be accessed using a shared identity manager 113. One or more third party services 111 can be provided by the same provider or by different providers. A third party service 111 can federate its authentication to the identity manager 113, which can authenticate a user and provide an authentication token that validates the user's identity within the identity manager 113.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Voice assistant associations 140 can specify one or more voice assistant devices 107 that are associated with a user account 129 and with which a user has authenticated. Once a voice assistant association 140 is established by a user, the assistant connection service 116 can provide data from a third party service 111 for playback by the voice assistant device 107. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

A single sign-on (SSO) token 136 is a software token generated by the identity manager 113 in response to a successful authentication of the user with the identity manager 113 using the authentication credentials 133. The SSO token 136 can be used to provide a client device 106 access to various third party services 111 on behalf of the authenticated user. Additionally, the SSO token 136 can be used by the assistant connection service 116 to access various third party services 111 on behalf of the authenticated user and a voice assistant device 107 associated with the user. In some instances, such as those implementing a version of the KERBEROS protocol, a separate SSO token 136 can be generated for each third party service 111 that the client device 106 attempts to access on behalf of the user. In other instances, the single SSO token 136 can be generated and used to provide the client device 106 with access to several of the third party services 111. Although each of the third party services 111 can have a different set of authentication credentials 133 linked to the user account 129, such as a different user name and password combination, the SSO token 136 allows the user to authenticate once with the identity manager 113 in order to use each of the third party services 111 instead of having to authenticate with each of the third party services 111 separately.

The access permissions 139 represent computing resources that the user account is authorized to access. For example, the access permissions 139 can indicate that a user account is permitted to access some third party services 111 but is prohibited from accessing other third party services 111. As another example, the access permissions 139 can indicate that the user account 129 can access certain features of a third party service 111 but prohibited from accessing other features. For example, if one of the third party services 111 that a user was permitted to access was a customer relationship management (CRM) service, the user might have permission to access his or her own contacts but be prohibited from accessing the sales contacts of other users. In some implementations, the access permissions 139 can be defined at a user group level rather than at a user level in a directory service.

An authentication token 143 is a token provided by the identity manager 113 or the third party service 111 in response to a successful authentication of the user. The authentication token 143 represents that a user account 129 is currently authenticated to access a third party service 111 and authorized to access or otherwise interact with the third party service 111 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the third party service 111. The authentication token 143 can be provided, for example, as part of an authentication exchange using a version of the OAUTH protocol.

A refresh token 146 is a token provided by one of the third party services 111 in response to a successful authentication with the third party service 111. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. In the event that a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

Each third party service 111 can be associated with a federated user account. A user with a user account 129 may also have multiple federated user accounts. For example, a user may have one federated user account for each third party service 111 that the user is registered or enrolled with. As another example, the user may have multiple federated user accounts for a third party service 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface to be rendered on the display. The client application 153 can represent various types of applications executable by the client device 106. For example, the client application 153 could be a web browser and the user interface could include a web page rendered within a browser window. As another example, the client application 153 could be an email application and the user interface could represent a graphical user interface for viewing, editing, and composing emails.

Additionally, the client application 153 can represent an application that facilitates user authentication with the authentication service 119 and the assistant connection service 116 so that a user can create an association between a voice assistant device 107 and her user account 129. To this end, the client device 106 can include one or more local area network interfaces, microphones, speakers, or cameras that facilitate communication with a voice assistant device 107.

The voice assistant device 107 represents a smart speaker or any device that has a microphone and audio playback capability to provide a voice assistant experience. A voice assistant experience means an experience in which a user can provide spoken commands or requests that are captured by one or more microphones integrated with or in communication with the voice assistant device 107, and the voice assistant device 107 play back audio using a speaker in response to the spoken commands or requests. For example, a user can ask the voice assistant device 107 to play music or retrieve information from the Internet, and the voice assistant device 107 can cause playback of the requested music or information through an integrated speaker or an audio playback device in communication with the voice assistant device 107. In some examples, a voice assistant can represent an application that is executed by a client device 106 rather than a standalone device. For example, a user's smartphone can execute an assistant application that provides a voice assistant experience similar to a voice assistant device 107. Examples of this disclosure can operate through such a voice assistant application.

The voice assistant service 109 can communicate with the voice assistant device 107 to process voice commands and facilitate retrieval of information for playback through the voice assistant device 107. The voice assistant service 109 can perform voice recognition or speech-to-text conversion on audio captured by the voice assistant device 107, identify a command or action to perform in response to the captured audio, and response to the voice assistant device 107 audio that should be played back through the voice assistant device 107. The voice assistant service 109 can also provide an API so that third parties can create applications or extend the capabilities of the voice assistant device 107. These applications or capabilities can be implemented within a cloud-based voice assistant service 109 so that the functionality does not need to be implemented within every voice assistant device 107 that is deployed in order for extended capabilities to be available to every user.

In the context of this disclosure, the assistant connection application 159 represents an application or skill that can be implemented within an assistant API or ecosystem in which the voice assistant is implemented. The assistant connection application 159 can represent an SSO application through which a user can authenticate with the identity manager 113 using the voice assistant device 107. Upon authentication, the assistant connection application 159 can retrieve data from the assistant connection service 116 or third party services 111 and cause at least a portion of the data to be played back through the voice assistant device 107. Accordingly, various commands can be implemented in the assistant connection application 159, such as commands to retrieve or make changes to data in a user's calendar, email, or other federated services.

Also in the context of this disclosure, the third party service application 161 can represent an application or skill that can be implemented within an assistant API or ecosystem in which the voice assistant is implemented. any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

The third party service application 161 can obtain data from a third party service 111 and permit playback of the data through a voice assistant device 107. The third party service application 161 can be instrumented to receive voice or text queries from the voice assistant device 107 and perform operations within the third party service 111 on behalf of a user. The voice assistant service 109 can invoke or execute the third party service application 161 in response to a keyword or hotword that is detected by the or on behalf of the voice assistant device 107.

The third party service 111 to which a third party service application 161 corresponds will typically require some form of user authentication before providing the third party service application 161 with user-specific data or information. For example, the third party service 111 might be a salesforce tool that contains highly sensitive sales lead data. Accordingly, the third party service application 161 or the assistant connection application 159 can authenticate a user's access to the third party service 111. Additionally, the third party service application 161 or the assistant connection application 159 can permit SSO according to examples of this disclosure. In this way, once a user has associated the voice assistant device 107 with his or her user account 129 by authenticating with the identity manager 113, the identity manager 113 can also allow the user to access third party services 111 that have federated their authentication to the identity manager 113.

To accomplish SSO on behalf of the third party service 111 through the voice assistant device 107, a client application 153 on the client device 106 associated with the user can play a secondary authentication factor through a speaker of the client device 106. The secondary authentication factor can be embedded in a soundwave that comprises an ultrasonic or infrasonic sound clip in which a secret key or one-time password is embedded. The secondary authentication factor can be generated by the identity manager 113 and provided to the third party service 111, which can provide the secondary authentication factor to the client application 153. In some examples, the secondary authentication factor can be provided by the identity manager 113 directly to the client application 153.

The secondary authentication factor can be captured by a microphone of the voice assistant device 107. The third party service application 161 or assistant connection application 159 can extract and verify the secret key. The verification of the secret key can be accomplished by contacting the identity manager 113 and providing the secret key along with a user identifier and/or device identifier that identifies the voice assistant device 107. The identity manager 113 can respond to the third party service application 161 with an authentication token 143 corresponding to the third party service 111. The third party service application 161 can utilize the authentication token 143 to contact the third party service 111 on behalf of the user thereafter.

In some implementations, the secondary authentication factor can be the client device 106 itself or proximity of the client device 106 to the voice assistant device 107. Proximity can be determined based upon a NFC tag located on or near the voice assistant device 107, Bluetooth beacons, Wi-Fi Direct, GPS, or other location or proximity detection mechanisms.

Next, a general description of the operation of the various components of the networked environment 100 is provided. To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119.

In some embodiments, the authentication service 119 can then authenticate the user with one or more of the third party services 111 in the background or upon the first request for data from a particular third party service 111. For example, the authentication service 119 can send the user's SSO token 136 to each third party service 111 that an access permission 139 indicates a user is authorized to access. In other instances, the authentication service 119 can send the user's SSO token 136 to every third party service 111 that is registered with the identity manager 113. In some embodiments, the SSO token 136 can be included in an authentication request that complies with a version of the OAUTH protocol.

The computing environment 103 can also verify that the user account 129 associated with the SSO token 136 is allowed to access the third party service 111. For example, the authentication service 119 or assistant connection service 116 can query the data store 126 to retrieve a username or other user identifier for the user account 129 associated with the single sign-on token 136. The computing environment 103 can then compare the retrieved username or other user identifier with its own list of registered or authorized users. If the retrieved username or other user identifier matches a username or user identifier stored in the list of registered or authorized users maintained by the third party service 111, then the computing environment 103 can determine that the user account 129 linked to the SSO token 136 is authorized to access the third party service 111. Upon successful authorization, the computing environment 103 can generate an authentication token 143 and a refresh token 146 and provide them to the authentication service 119. In some instances, the authentication token 143 and the refresh token 146 can be included in a response that complies with a version of the OAUTH protocol.

The authentication service 119 can then cache or otherwise store the authentication token 143 and the refresh token 146 for future use. The authentication service 119 can, for example, provide the authentication token 143 in response to requests from authorized applications. For example, the authentication service 119 can provide the authentication token 143 for the user in response to a request from the assistant connection service 116.

In addition, the authentication service 119 can automatically obtain a new authentication token 143 for the user when the current authentication token 143 expires or is about to expire. For example, the authentication service 119 can determine that the authentication token 143 was obtained 59 minutes ago, but is only valid for one hour. As another example, the authentication service 119 can determine that the authentication token 143 was obtained 61 minutes ago, but the authentication token 143 was only valid for one hour. In response to either example, the authentication service 119 can submit a second authentication request to the third party service 111. The second authentication request can include the refresh token 146.

In response, the third party service 111 can evaluate the refresh token 146 to determine whether the refresh token 146 is still valid. For example, the third party service 111 could evaluate the refresh token 146 to determine whether it has expired. As another example, the third party service 111 could evaluate the refresh token 146 to determine whether it has been revoked. If the refresh token 146 remains valid, the third party service 111 can then provide the authentication service 119 with a new authentication token 143. By storing authentication tokens 143 in the data store 126, the assistant connection service 116 can utilize the tokens to access data from one or more third party service 111 on behalf of the user.

Accordingly, a user might desire to use a voice assistant device 107 to access data from third party services 111. The voice assistant device 107 might be in a shared environment, such as a hotel, office, or other shared setting. Accordingly, the functionality associated with the third party service application 161 running in coordination with the voice assistant device 107 can provide a skill or capability that the user can invoke on the voice assistant device 107. The third party service application 161 can communicate with the assistant connection service 116 to make a determination as to whether a user account 129 is associated with a particular voice assistant device 107. Additionally, the third party service application 161 and assistant connection service 116 can exchange communications that enable the voice assistant device 107 to play back data requested by the user from the third party service 111.

The third party service application 161 can be invoked by the user through a keyword spoken by the user. For example, the user can speak "Assistant, please open sales force tool." The keyword "sales force tool," or any other keyword, can be associated with the third party service application 161 within the assistant ecosystem. When the user invokes the assistant functionality on the voice assistant device 107 and speaks a particular keyword, the assistant third party service application 161 can be launched by voice assistant service 109.

The third party service application 161 can be instrumented to obtain data from particular third party services 111 on behalf of a user. For example, if the user requests data from her calendar, email, contacts, or other third party services 111, the third party service application 161 can obtain the requested data through the assistant connection service 116. However, the user must first authenticate her user account 129 using the voice assistant device 107 so that the assistant connection service 116 can associate the voice assistance device 107 with the user account 129 of the user. Upon authenticating, the user can then access data from third party services 111 that utilize the identity manager 113 for SSO.

Figure 2:
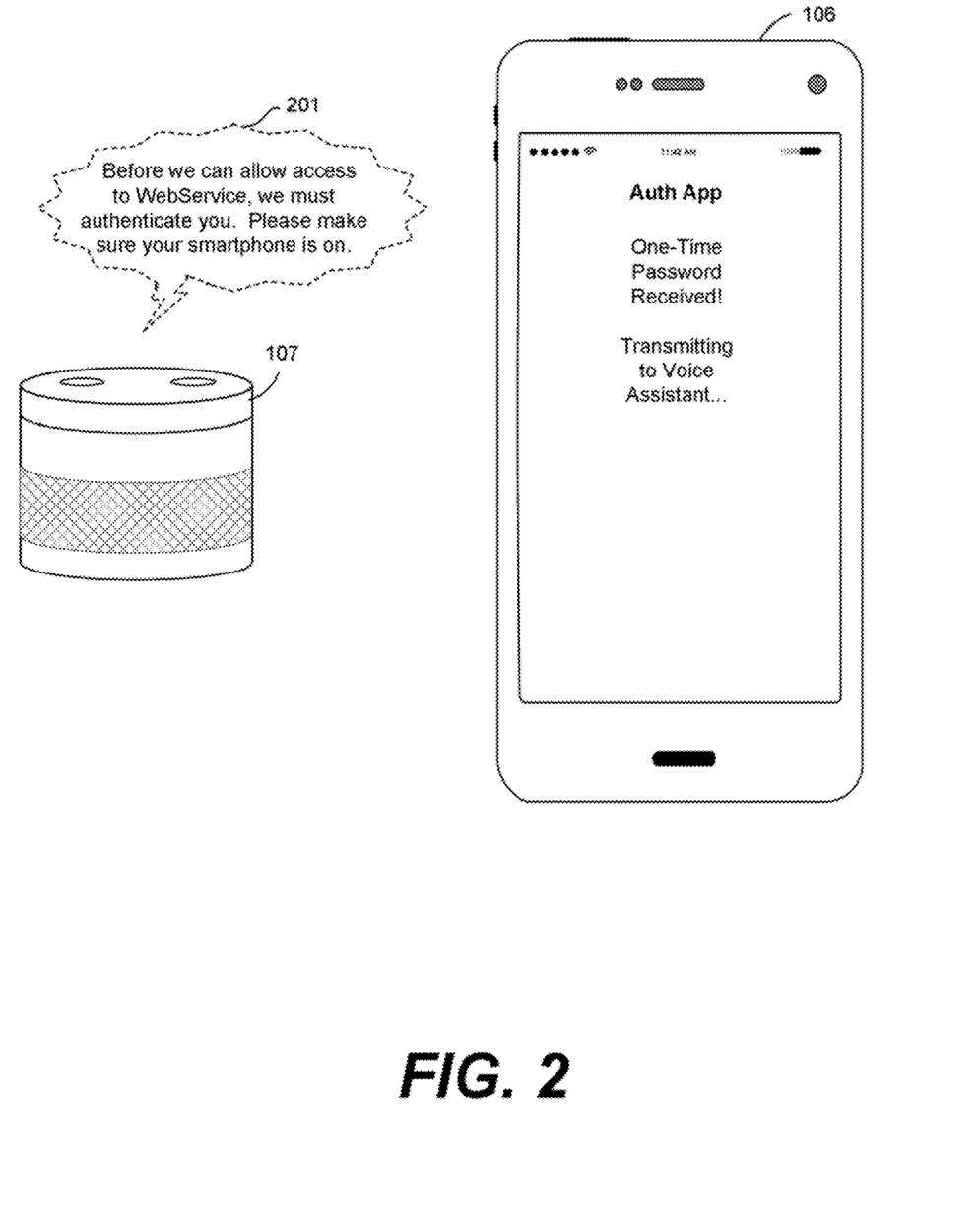
FIG. 2 depicts a scenario according to examples of the disclosure.

Referring next to FIG. 2, shown is a scenario that illustrates how interactions between a user, the voice assistant device 107, and the user's client device 106 can operate. The scenario shown in FIG. 2 assumes that the user has already authenticated his or her client device 106 with the identity manager 113 using a voice assistant authentication protocol and has subsequently linked the voice assistant device 107 with his or her user account 129 through the assistant connection application 159, for example. In the scenario shown, the user has invoked the functionality in the voice assistant device 107 that is provided by the third party service application 161. The third party service application 161 can be implemented using APIs provided by an assistant platform on which the voice assistant device 107 runs. The third party service application 161 can be implemented as a third party application, skill, or capability of the voice assistant device 107 that extends the capability of the voice assistant device 107 to enable users to obtain data from third party services 111 associated with the user account 129.

In FIG. 2, the user can ask the voice assistant device 107 to launch or invoke the third party service application 161 by using a keyword linked to the third party service application 161 within an assistant ecosystem in which the voice assistant device 107 operates. The user can request that the voice assistant device 107 retrieve data from the user's calendar, email, task list, or another third party service 111 for which access is authenticated by the identity manager 113. Upon launching the third party service application 161, the user can request that the third party service application 161 access data from a third party service 111 linked to her enterprise account. The third party service application 161 can determine whether it has an unexpired authentication token 143 with which to access the third party service 111. If no authentication token 143 is accessible to the third party service application 161, the third party service application 161 can contact the assistant connection service 116 to request an authentication token 143. The request can include a device identifier that corresponds to the voice assistant device 107 for which the third party service application 161 is executing. In response to receiving such a request, the assistant connection service 116 can initiate an authentication workflow.

If the voice assistant device 107 is not linked with a voice assistant association 140 of a particular user account 129, the assistant connection service 116 can respond to the third party service application 161 with an indication to initiate a user authentication workflow. The response from the assistant connection service 116 can cause the third party service application 161 to instruct the voice assistant device 107 to play back a message 201 that tells the user that authentication is required before data can be retrieved from a third party service 111.

The message 201 can instruct the user to launch a particular application on a client device 106 or make sure their client device 106 is powered on. In some examples, the client application 153 can simply be present on the user's device and the assistant connection service 116 can cause a push notification to be sent to the application. The client application 153 can be a single sign-on application that is used by the enterprise to facilitate single sign-on functionality for other apps and third party services 111 that the user might access through a smartphone, personal computer, or other device. The application on the client device 106 can allow the user to authenticate with the identity manager 113 and obtain SSO tokens that other apps on the client device 106 can utilize to authenticate the user's identity to third party services 111.

Accordingly, a client application 153 on the client device can also facilitate authentication of the user through the voice assistant device 107 and the third party application 161 so that the third party application 161 running on or on behalf of the voice assistant device 107 is linked with the user account 129 of the user. Once authentication has been established through the client application 153, the user can then request the voice assistant device 107 to obtain data from third party services 111 of the user through the voice assistant application 161. Again, FIG. 2 assumes that the user has already linked the voice assistant device 107 with his or her user account 129 by authenticating with the identity manager 113. As a result, the voice assistant device 107 is associated with the user account 129 in the data store 126. In one example, a device identifier of the voice assistant device 107 is mapped to a user identifier corresponding to the user account 129, such as in a voice assistant association 140.

As shown in FIG. 2 and described in further detail herein, the user can also access third party services 111 through a third party application 161 that has federated its authentication to the identity manager 113. However, a third party service 111 can often require an authentication token 143 issued by the third party service 111 or the identity manger 113 that authenticates a user account 129. Accordingly, the third party application 161 can contact the assistant connection service 116 and request an authentication token 143. The assistant connection service 116 can initiate a request to link the user to the voice assistant device 107. The authentication can be performed using a secondary authentication factor that is provided to the client device 106 and captured by the voice assistant device 107. By providing the secondary authentication factor to the client device 106, the proximity of the client device 106 to the voice assistant device 107 can be proven.

In the scenario shown in FIG. 2, the assistant connection service 116 can respond to the request from the third party service application 161 with an indication that an authentication workflow should be completed. In response, the third party service application 161 can play a message 201 that informs the user that his or her client device 106 should be available or powered on and await receipt of a secret key or secondary authentication factor from the user's client device 106. The assistant connection service 116 can also determine if the voice assistant device 107 is associated with a user account 129. If a voice assistant association 140 is found that links the voice assistant device 107 with a user account 129, the assistant connection service 116 can then cause a secondary authentication factor, which can comprise a soundwave in which a one-time password or secret key is embedded. The soundwave can be an ultrasonic or infrasonic sound that is inaudible to the user. The secret key can be embedded into the soundwave using steganography or a mechanism by which a secret key is embedded into a soundwave. The assistant connection service 116 can send a packet or response that includes the secret key and the device identifier to the client application 106, which can cause the client device 106 to play a soundwave in which the secret key and device identifier are embedded. The secret key and device identifier can be embedded into a soundwave using steganography so that the information is embedded into a perceptible sound such as music, voice, or other sounds. In another implementation, the secret key and device identifier are simply encoded into a soundwave that can be played back by the client device 106. The soundwave can be encoded by the assistant connection service 116 or identity manager 113 based upon the secret key provided by the assistant connection service 116. The data embedded into the soundwave can also be an encrypted form of the secret key and device identifier.

The secondary authentication factor can be sent to the client application 153 using a push notification. A sound file can be embedded into the push notification or the push notification can instruct the client application 153 to retrieve the sound file from the assistant connection service 116 or another service. Once the client application 153 obtains the secondary authentication factor, or the sound file, the client application 153 can play the sound file through an integrated speaker or speaker system to which the client device 106 has access.

The third party service application 161 can capture the sound in which the secret key is embedded using a microphone or microphone system of the voice assistant device 107. The third party service application 161 can extract the secret key and provide it along with a device identifier of the voice assistant device 107 to the assistant connection service 116. The assistant connection service 116 can verify that the secret key received from the third party service application 161 is the same secret key that was provided as a part of the secondary authentication factor to the client device 106.

If the secret key received from the third party service application 161 matches the secret key that was sent to the client application 153, the assistant connection service 116 can deem the user authenticated and issue an authentication token 143 to the third party service application 161 that corresponds to the user account 129. The authentication token 143 can be one that was previously obtained on behalf of the user or generated once the secret key received from the third party service application 161 has been verified by the assistant connection service 116. Once the authentication token 143 corresponding to the third party service 111 is issued to the third party service application 161, the third party service application 161 can obtain data from the third party service 111 on behalf of a user corresponding to the user account 129 that is linked to the voice assistant device 107.

Figure 3:
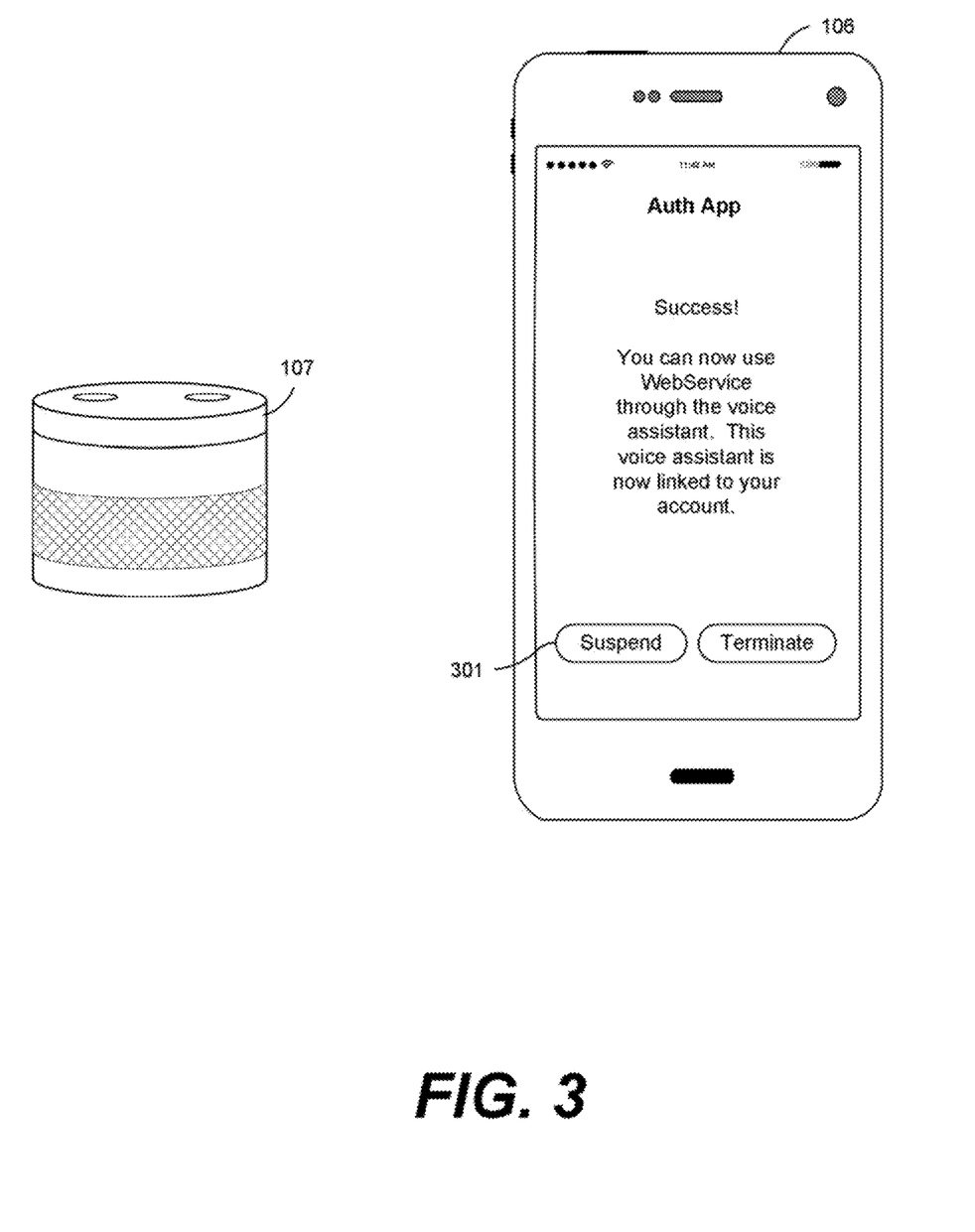
FIG. 3 depicts a scenario according to examples of the disclosure.

Referring next to FIG. 3, shown is a user interface that illustrates one example of how the user can be informed that an association between the voice assistant device 107 and a third party service 111 can be established using the third party service application 161 and the assistant connection service 116. Upon obtaining the secret key embedded within a secondary authentication factor provided to the client device 106 through the voice assistant device 107, the user can be informed by the client application 153 that the user can now access data from the third party service 111 using the voice assistant device 107. The user can also be informed of this through a message that is played back by the voice assistant device 107. The linkage between the voice assistant device 107 and the user account 129 because the assistant connection service 116 has provided an authentication token 143 corresponding to the third party service 111 and the user account 129 to the third party service application 161.

Additionally, the client application 153 can allow the user to suspend or terminate the association of his user account 129 with the voice assistant device 107. For example, if the user wishes to temporarily suspend access to one or more third party services 111 on behalf of his user account 129, the suspend button 301 can be activated. The suspend feature in the client application 153 can transmit an indication to the assistant connection service 116 of the suspension, which can transmit an indication to the third party service application 161 of the suspension. The third party service application 161 can either delete the authentication token 143 or decline queries from the user while the suspension is in place. In some examples, the assistant connection service 116 can also cause revocation of the authentication token 143 during the suspension.

If the user terminates the association between his user account 129 with the voice assistant device 107, the client application 153 can transmit an indication to the assistant connection service 116 of the suspension, which can transmit an indication to the third party service application 161 of the termination. The third party service application 161 can either delete the authentication token 143 or decline queries from the user after the termination occurs. In some examples, the assistant connection service 116 can also cause revocation of the authentication token 143 after the termination. In some implementation, suspension or termination can occur if the client device 106 is determined to be out of proximity to the voice assistant device 107. Proximity can be determined based upon Bluetooth beacons, Wi-Fi Direct, GPS, or other location or proximity detection mechanisms.

In one example, a new secondary authentication can be periodically sent to the client application 153 and captured by the voice assistant device 107 to determine proximity of the client device 106 to the voice assistant device 107. If a secret key embedded in a subsequent secondary authentication factor is not received by the assistant connection service 116 within a timeout period, the assistant connection service 116 can terminate or suspend the association between the user account 129 and then voice assistant device 107 and delete or revoke the authentication token 143.

Figure 4:
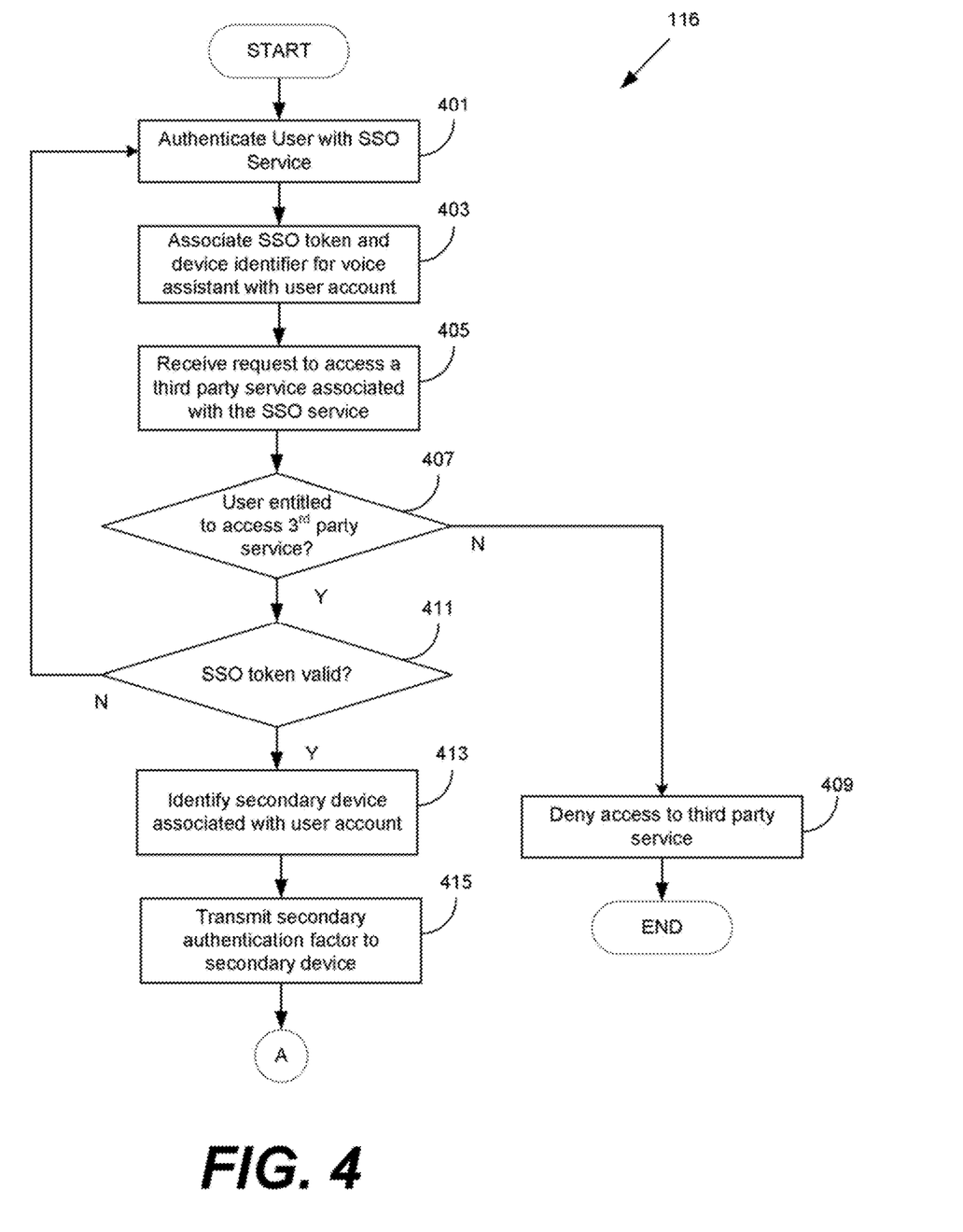
FIG. 4 is a flow chart depicting the operation of an example of a component of the client device of the network environment of FIG. 1.
Figure 5:
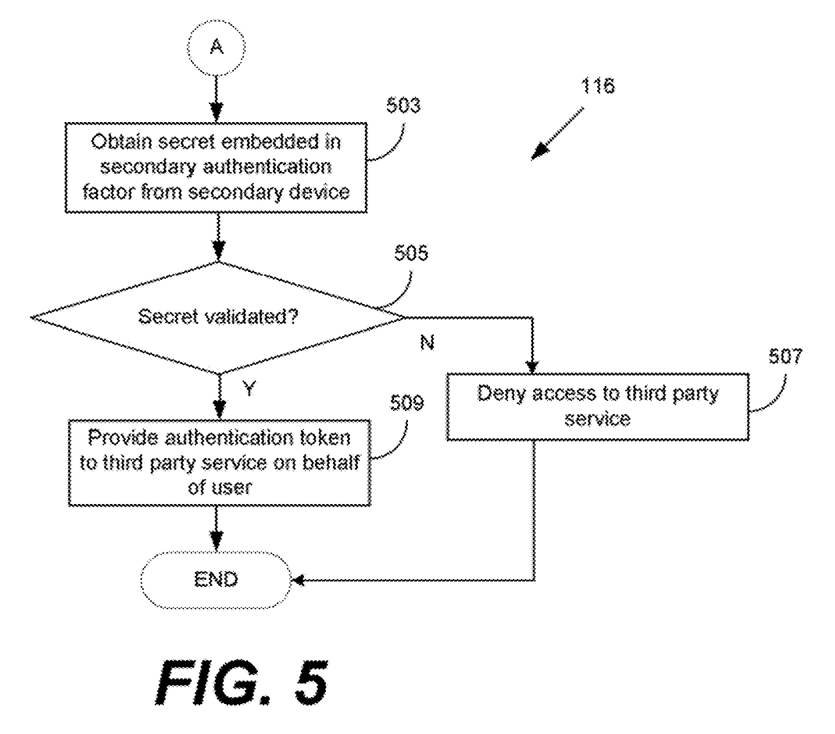
FIG. 5 is a flow chart depicting the operation of an example of a component of the client device of the network environment of FIG. 1.

FIG. 4 is a flowchart, continued in FIG. 5, depicting an example of the operation of a portion of the assistant connection service 116 and potentially other applications or services shown in FIG. 1. As an alternative, the flowchart of FIG. 4 can be viewed as depicting an example of elements of a method.

Beginning at step 401, the assistant connection service 116 can facilitate authentication of a user with the identity manager 113 or an SSO service on behalf of a voice assistant device 107. Authentication of the user can link the voice assistant device 107 with the user account 129. Authentication of the user in step 401 can be viewed as an initial user authentication after which the user can take advantage of single sign-on capabilities provided by the identity manager 113 to access data from third party services 111 that have federated their authentication to the identity manager 113. Accordingly, the initial authentication might require the user to enter user credentials into a client application 106 or otherwise prove an identity as well as a proximity to the voice assistant device 107. Accordingly, as a result of the authentication, the voice assistant device 107, or a device identifier that uniquely identifies the voice assistant device 107 with respect to other assistant devices, can be linked to a user account 129 of the user following the initial authentication.

At step 403, the assistant connection service 116 can associate an SSO token for the initial authentication with the user account 129 as well as the voice assistant device 107. The association can be a voice assistant association 140 that maps a user account 129, a voice assistant device 107, and the initial authentication together.

At step 405, the assistant connection service 116 can receive a request to access a third party service 111 on behalf of a voice assistant device 107. The request can be sent from the third party service application 161 in response to a user activating the third party service application 161. The request can be a request for an authentication token 143 with which the third party service application 161 can access the third party service 111 on behalf of a user account 129 that is currently linked to the voice assistant device 107. The request can include a device identifier of the voice assistant device 107.

At step 407, in response to receiving the request in step 405, the assistant connection service 116 can determine whether a user linked to the voice assistant device 107 in a voice assistant association 140 is entitled to access the third party service 111 that corresponds to the third party service application 161. In some implementations, not all users with a user account 129 will be entitled to access the third party service 111 using the third party service application 161. Accordingly, if the user currently linked to the voice assistant device 107 is not entitled to access the third party service 111 through the third party service application 161, the process can proceed to step 409. At step 409, the third party service application 161 can deny access to the third party service 111 through the voice assistant device 107. In one example, the third party service application 161 can play a message informing the user of the authentication failure. If the user is entitled to access the third party service 111 through the voice assistant device 107, the process can proceed from step 407 to step 411.

At step 411, the assistant connection service 116 can determine whether the SSO token corresponding to the initial authentication is still valid. In other words, the assistant connection service 116 can determine whether the initial authentication session that links the voice assistant device 107 to the user account 129 is still valid. If the session has expired, the process can return to step 401 where the initial authentication linking together the user account 129 and the voice assistant device 107 can be performed again. If the SSO token is still valid, the process can proceed to step 413.

At step 413, the assistant connection service 116 can identify a secondary device, or a client device 106, for example, that is associated with the user account 129. The client device 106 can be one that is enrolled as a managed device with a device management system implemented by the enterprise and that is linked to the user account 129 of the user. The client device 106 can be running the client application 153 and managed by a device management system that enforces various compliance rules and policies on the device. In some scenarios, the client device 106 can be owned by the enterprise or be a device of the user that is enrolled with such a management system.

At step 415, the assistant connection service 116 can transmit a secondary authentication factor to the secondary device, or the client device 106. The secondary authentication factor can be generated by the assistant connection service 116 or another application on behalf of the assistant connection service 116. The secondary authentication factor can include a soundwave in which a secret key is embedded. The secret key can represent a one-time password or other form of token that can be later verified by the assistant connection service 116. The sound file provided by the assistant connection service 116 as the secondary authentication factor can be played back by the client application 153 as shown in FIGS. 2-3 and captured by the voice assistant device 107. Accordingly, the process proceeds to block A from step 415, which continues the process in FIG. 5.

Proceeding from block A in FIG. 5, the process moves to step 503. At step 503, the secret key can be obtained from the third party service application 161. The secret key can represent the data embedded into the secondary authentication factor that was transmitted to the client device 106 and captured by the voice assistant device 107 on behalf of the third party service application 161.

At step 505, the assistant connection service 116 can validate the secret key received from the third party service application 161. The secret key can be validated by verifying that the secret key matches the secret key that was generated and provided to the client device 106 as the secondary authentication factor. If the secret key cannot be validated at step 505, the process proceeds to step 507, where the third party service application 161 can deny access to the third party service 111 through the voice assistant device 107. In one example, the third party service application 161 can play a message informing the user of the authentication failure. If the user is entitled to access the third party service 111 through the voice assistant device 107, the process can proceed from step 505 to step 509.

At step 509, the assistant connection service 116 can provide an authentication token 143 that authorizes access to the user's account in the third party service 111. The authentication token 143 can be generated on behalf of the user account 129 by the identity manager 113 or the third party service 111. Thereafter, the third party service application 161 can access data in the third party service 111 on behalf of a user corresponding to the user account 129. In this way, the third party service application 161 can handle voice queries of the user that are captured by the voice assistant device 107 until suspension of termination of the linkage between the user account 129 and the voice assistant device 107. Thereafter, the process can proceed to completion.

The flowcharts of FIGS. 4-5 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 4-5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system for authenticating a user with a service account through a voice assistant, comprising:
   at least one computing device;
   an application that, when executed by the at least one computing device, causes the computing device to at least:
      authenticate a user based on a voice assistant authentication protocol with a voice assistant;
      associate a device identifier corresponding to the voice assistant with a single sign-on (SSO) authentication token corresponding to the user;
      obtain a request from the voice assistant to access a third party service for which access is federated;
      determine that the user is entitled to access the third party service;
      verify a validity of the SSO token;
      determine that the device identifier corresponds to the voice assistant from which the request was obtained and from which the user was authenticated using the voice assistant authentication protocol;
      transmit a secondary authentication factor to a secondary device associated with the user in response to determining that the device identifier corresponds to the voice assistant, the secondary authentication factor comprising a secret key corresponding to the voice assistant and the user;
      receive the secret key from the voice assistant separate from the secondary device, wherein the secret key is obtained by extracting a stenographical signal embedded in a soundwave played back by the secondary device, wherein the soundwave is ultrasonic or infrasonic;
      validate the secret key; and
      authenticate the user to the third party service on behalf of the authentication service.

2. The system of claim 1, wherein the secret key is received from the voice assistant using a microphone of a voice assistant device on which the voice assistant is executed.

3. The system of claim 2, wherein the secondary authentication factor comprises an ultrasonic or infrasonic sound that is played back by the secondary device and captured by the microphone.

4. The system of claim 1, wherein the application, when executed by the at least one computing device, causes the computing device to at least transmit an authentication token to the voice assistant on behalf of the user, the authentication token verifying the user to the third party service.

5. The system of claim 4, wherein the authentication token is provided to an application providing a voice assistant capability for the third party service in the voice assistant.

6. The system of claim 1, wherein the application causes the at least one computing device to cause a message indicating an authentication failure to be played by the voice assistant in response to the secret key not being received within a timeout period.

7. The system of claim 1, wherein the voice assistant authentication protocol links the voice assistant and the user account in a single sign-on session.

8. A non-transitory computer-readable medium comprising machine-readable instructions, wherein the instructions, when executed by at least one processor, cause a computing device to at least:
   authenticate a user based on a voice assistant authentication protocol with a voice assistant;
   associate a device identifier corresponding to the voice assistant with a single sign-on (SSO) authentication token corresponding to the user;
   obtain a request from the voice assistant to access a third party service for which access is federated;
   determine that the user is entitled to access the third party service;
   verify a validity of the SSO token;
   determine that the device identifier corresponds to the voice assistant from which the request was obtained and from which the user was authenticated using the voice assistant authentication protocol;
   transmit a secondary authentication factor to a secondary device associated with the user in response to determining that the device identifier corresponds to the voice assistant, the secondary authentication factor comprising a secret key corresponding to the voice assistant and the user;
   receive the secret key from the voice assistant separate from the secondary device, wherein the secret key is obtained by extracting a stenographical signal embedded in a soundwave played back by the secondary device, wherein the soundwave is ultrasonic or infrasonic;
   validate the secret key; and
   authenticate the user to the third party service on behalf of the authentication service.

9. The non-transitory computer-readable medium of claim 8, wherein the secret key is received from the voice assistant using a microphone of a voice assistant device on which the voice assistant is executed.

10. The non-transitory computer-readable medium of claim 9, wherein the secondary authentication factor comprises an ultrasonic or infrasonic sound that is played back by the secondary device and captured by the microphone.

11. The non-transitory computer-readable medium of claim 8, wherein the instructions, when executed by the at least one processor, cause the at least one processor to at least transmit an authentication token to the voice assistant on behalf of the user, the authentication token verifying the user to the third party service.

12. The non-transitory computer-readable medium of claim 11, wherein the authentication token is provided to an application providing a voice assistant capability for the third party service in the voice assistant.

13. The non-transitory computer-readable medium of claim 8, wherein the instructions cause the at least one processor to cause a message indicating an authentication failure to be played by the voice assistant in response to the secret key not being received within a timeout period.

14. The non-transitory computer-readable medium of claim 8, wherein the voice assistant authentication protocol links the voice assistant and the user account in a single sign-on session.

15. A method comprising:
authenticating a user based on a voice assistant authentication protocol with a voice assistant;
associating a device identifier corresponding to the voice assistant with a single sign-on (SSO) authentication token corresponding to the user;
obtaining a request from the voice assistant to access a third party service for which access is federated;
determining that the user is entitled to access the third party service;
verifying a validity of the SSO token;
determining that the device identifier corresponds to the voice assistant from which the request was obtained and from which the user was authenticated using the voice assistant authentication protocol;
transmitting a secondary authentication factor to a secondary device associated with the user in response to determining that the device identifier corresponds to the voice assistant, the secondary authentication factor comprising a secret key corresponding to the voice assistant and the user;
receiving the secret key from the voice assistant separate from the secondary device, wherein the secret key is obtained by extracting a stenographical signal embedded in a soundwave played back by the secondary device, wherein the soundwave is ultrasonic or infrasonic;
validating the secret key; and
authenticating the user to the third party service on behalf of the authentication service.

16. The method of claim 15, wherein the secret key is received from the voice assistant using a microphone of a voice assistant device on which the voice assistant is executed.

17. The method of claim 16, wherein the secondary authentication factor comprises an ultrasonic or infrasonic sound that is played back by the secondary device and captured by the microphone.

18. The method of claim 15, further comprising transmitting an authentication token to the voice assistant on behalf of the user, the authentication token verifying the user to the third party service.

19. The method of claim 18, wherein the authentication token is provided to an application providing a voice assistant capability for the third party service in the voice assistant.

20. The method of claim 15, further comprising causing a message indicating an authentication failure to be played by the voice assistant in response to the secret key not being received within a timeout period.

* * * * *